United States Patent
Ozeki

(10) Patent No.: US 6,925,899 B2
(45) Date of Patent: Aug. 9, 2005

(54) HOLLOW STEERING RACK BAR AND ITS MANUFACTURING METHOD

(75) Inventor: Keita Ozeki, Kariya (JP)

(73) Assignee: Neturen Co., Ltd., Tokyo (JP)

( * ) Notice: Subject to any disclaimer, the term of this patent is extended or adjusted under 35 U.S.C. 154(b) by 218 days.

(21) Appl. No.: 10/306,346

(22) Filed: Nov. 29, 2002

(65) Prior Publication Data

US 2003/0097894 A1 May 29, 2003

(30) Foreign Application Priority Data

Nov. 29, 2001 (JP) ........................................ 2001-364372

(51) Int. Cl.$^7$ ................................................. F16H 1/04
(52) U.S. Cl. ............................. 74/422; 74/109; 74/120
(58) Field of Search .......................... 74/422, 109, 120, 74/89.11

(56) References Cited

U.S. PATENT DOCUMENTS

| | | | |
|---|---|---|---|
| 4,598,451 A | | 7/1986 | Ohki |
| 5,473,960 A | | 12/1995 | Sakamoto et al. |
| 6,000,267 A | | 12/1999 | Yagi |
| 6,082,483 A | * | 7/2000 | Taniguchi et al. .......... 180/444 |
| 6,244,374 B1 | * | 6/2001 | Tomita et al. .............. 180/446 |
| 2001/0006000 A1 | | 7/2001 | Oka et al. |
| 2001/0020328 A1 | * | 9/2001 | Tsubouchi et al. ....... 29/893.34 |

FOREIGN PATENT DOCUMENTS

| | | |
|---|---|---|
| EP | 0 857 639 | 8/1998 |
| EP | 1 112 791 | 7/2001 |
| EP | 1 177 986 | 2/2002 |
| GB | 813246 | 5/1959 |
| JP | HEI 3-5892 | 1/1991 |
| JP | HEI 6-182472 | 7/1994 |
| JP | HEI 6-207623 | 7/1994 |
| JP | HEI 6-246379 | 9/1994 |
| JP | 9-58489 | 3/1997 |
| JP | HEI 9-58489 | 3/1997 |
| JP | 9-132151 | 5/1997 |

OTHER PUBLICATIONS

European Search Report dated Apr. 7, 2003, for EP No. 02 02 6480.

* cited by examiner

*Primary Examiner*—David M. Fenstermacher
(74) *Attorney, Agent, or Firm*—Antonelli, Terry, Stout & Kraus, LLP

(57) ABSTRACT

Described is a steering rack bar which is low in costs, which is hollowed in overall length, and for use in steering equipment for automobiles. A rack is formed on a first steel tube by plastic working, wherein the first steel tube has good plastic workability by low carbon content, and has high strength after hardening. The above first steel tube and a second steel tube are joined to complete a hollow steering rack bar, wherein the second steel tube has a higher carbon content and is lower in cost than the first steel tube. Moreover, the second steel tube which has a margin of the strength can be thinner than the first steel tube for reduction of weight.

43 Claims, 9 Drawing Sheets

HOLLOW STEERING RACK BAR AND ITS MANUFACTURING METHOD

BACKGROUND Of THE INVENTION

The present invention relates to a steering rack bar which is one of the components of steering equipment for automobiles, and also relates to its manufacturing method. Recently, for the purpose of weight reduction in automobiles, it is tried to make such as shafts hollowed which has been usually solid. The object of this invention is a hollow steering rack bar for such purpose. The present invention provides hollow steering rack bars of excellent quality and enough strength in low costs.

The steering rack bar has a shape that a rack is formed, for instance, along about half-length of a shaft with a circular crosssection. For making hollowed for weight reduction, conventionally a solid bar has been drilled a hole after cutting a rack on the surface. It can be considered that the rack is cut on a flattened part of a tube by making use of an originally hollow material, namely, the tube. However, actually it is difficult to secure necessary strength of the rack, because the thickness at the part of the rack becomes very thin by the cutting. On the other hand, it was proposed that only the part where a rack is not formed is made hollowed, as abandoning to make hollowed the part where the rack is formed. Japanese laying-open patent publication 9-58489 concerns the above technique, wherein a rack bar is completed by crimping to join a steel tube and a solid bar which is formed a rack.

Another method is proposed in Japanese patent publication 3-5892, wherein a rack is formed by plastic working on a raw steel tube, so as to make a steering rack bar which is hollowed in the overall length. Several improvements to the above method have been devised, then, production by the above method is rapidly increasing. The method disclosed in Japanese patent publication 3-5892 consists of two processing stages, i.e. preliminarily flattening of a part of the steel tube, and then forming a rack on the flattened part. In the first place, a part of a raw steel tube to be processed is held in a primary-forming split dies, which can be opened right and left, and has a penetrating hole in a part to be formed a rack at a state of the dies being closed. Then, a punch having a flat top is inserted into the hole and the part of steel tube is flattened, for making a primary formed piece. In the next stage, the primary formed piece is held in secondary-forming split dies which can be opened right and left and has an inner shape coinciding with the outer shape of the completed rack bar. Namely, the secondary forming split dies have a female pattern of rack teeth in their upper parts at a state of the dies being closed. Then, mandrels are inserted into the steel tube in order to perform ironing of the previously flattened part from the inside of the steel tube. Consequently, the outer surface of the primarily formed piece is bulged, and a rack is formed according to the shape of the secondary-forming split dies.

SUMMARY OF THE INVENTION

The above method which forms the rack by plastic working has excellent performance, because the method does not waste material in comparison with cutting method, and can produce high quality products due to strengthening by plastic working. However, cost is rather high due to severe demand for material quality of the raw steel tube. Namely, in order to form a rack by pushing mandrels into the steel tube and ironing, and then by rising metal from the inside of the tube, the metal should deform conforming to the rack-forming pattern by material flow. Accordingly, the method demands material that has good plastic deformability in cold working. Contrarily, material strength should be high in a product of the rack bar, because thickness at roots of the rack teeth becomes rather small in comparison with the thickness of the raw steel tube. Under these circumstances, the present invention is intended to provide the hollow steering rack bar in lower cost, as remaining merits of the method for forming a rack by plastic working.

Namely, the present invention uses as raw materials that have different characteristics between a part with a rack and a part without a rack, and finally makes a product of the hollow steering rack bar by joining these two parts. More practically, this invention provides a steering rack bar, which is hollowed in an overall length, and formed a rack on a part of the length: wherein the rack bar is composed of a rack-formed section and a non-rack-formed section, wherein the rack-formed section contains one end of the rack bar, the rack and a portion of a succeeding circular cross-sectional part, and the non-rack-formed section contains a residual length other than the rack-formed section; and then, the rack bar is constructed by joining the rack-formed section and the non-rack-formed section, wherein constituents of steels are different between the rack-formed section and the non-rack-formed section wherein carbon content of the non-rack-formed-section is higher than the rack-formed section. The aforesaid rack-formed section and non-rack-formed section may be constituted that thickness of the non-rack-formed section is smaller than thickness of the circular cross-sectional part of the rack-formed section, notwithstanding the constituents of the steels are different as above-mentioned or not different between the rack-formed section and the non-rack-formed section.

Herein, the steel of the non-rack-formed section may be composed of 0.35 to 0.60% of carbon, 0.10 to 0.40% of silicon, 0.5 to 1.0% of manganese in weight percent, and iron as remainder except unavoidable impurities. Moreover, outer diameters may be different between the circular cross-sectional part of the rack-formed section and the non-rack-formed section; and, a groove for a ball screw may be provided in a part of length of the non-rack-formed section. It is favorable that at least roots of rack teeth among the rack-formed section have a hardened structure throughout a whole thickness.

Moreover, the present invention is a method of manufacturing a hollow rack bar, the method comprising: forming a rack on a first steel tube by plastic working, wherein the rack is not formed at least in one end part of the first steel tube; and joining the first steel tube which is formed the rack and a second steel tube by butting the aforesaid one end of the first steel tube and an end of the second steel tube, wherein constituents of steels are different between the first steel tube and the second steel tube wherein carbon content of the second steel tube is higher than the first steel tube. In the above method, instead of constituents of steels being different between the first steel tube and the second steel tube wherein carbon content of the second steel tube being higher than the first steel tube, the second steel tube can be thinner than the first steel tube, or, outer diameters of the first steel tube and the second steel tube can be different. Also, more than one of the conditions can be satisfied simultaneously among the above conditions concerning the constituents of steels, the thickness of the steel tubes and the outer diameter of the steel tubes. In the above methods, a groove for a ball screw may be formed in a part of length of the second steel tube before aforesaid joining.

Forming the rack on the first steel tube by plastic working in the above methods may comprises: flattening by pressing a part of a circumference of the first steel tube, wherein at least one end part of the first steel tube is not flattened; holding the flattened steel tube in a set of split dies, wherein the flattened part is in contact with a female pattern of the rack which is equipped inside of the split dies; successively inserting mandrels into the steel tube and forming the rack corresponding to the female pattern of the rack by ironing the flattened part of the steel tube from the interior of the steel tube. In the above-mentioned methods, at least rack teeth may be hardened at one of steps of the method after forming the rack, wherein the hardening is performed by heating a whole thickness of material to a hardening temperature, and, the joining may be performed by friction welding.

DETAILED DESCRIPTION OF THE PREFERRED EMBODIMENTS

Figure 1:
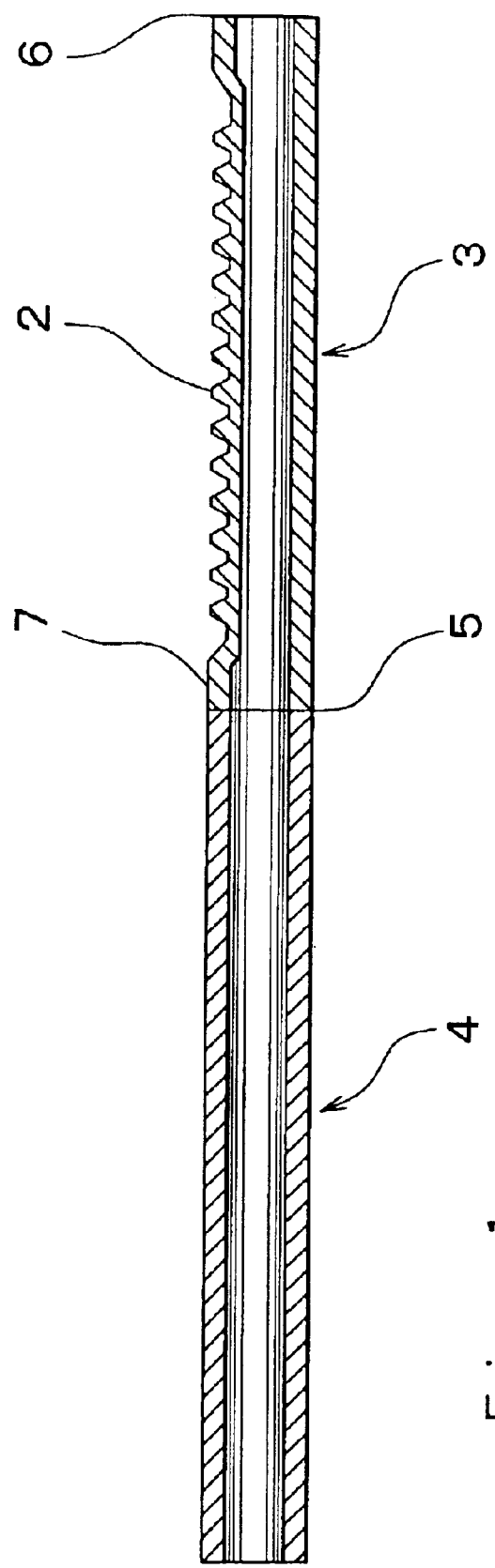
FIG. 1 and FIG. 2 are a cross-sectional view and a perspective view of a steering rack bar of this invention respectively.
Figure 2:
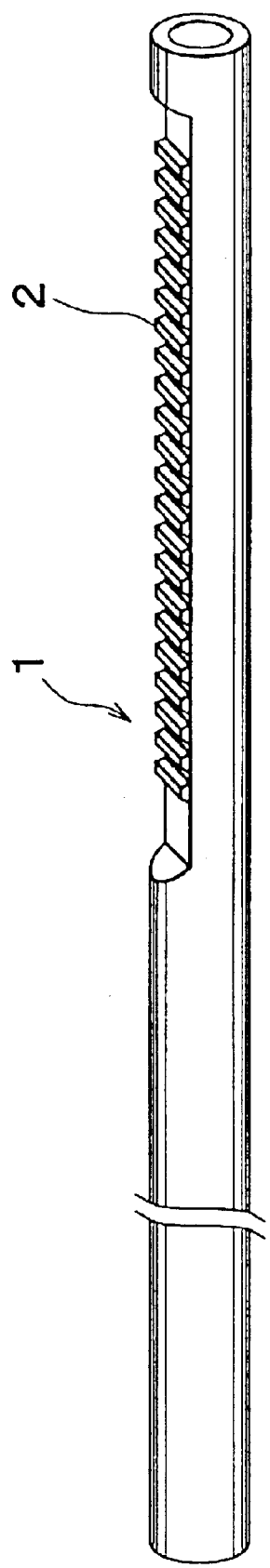

FIG. 2 is a perspective view of an example of the hollow steering rack bar 1 of this invention, wherein reference numeral 2 indicates a tooth of the rack. The characteristic point of this invention is that, as shown in FIG. 1, a part on which formed a rack in the total length of a rack bar and a residual part of the length are made of different members, and these are joined together at joint 5 for completing a steering rack bar. In this invention, the aforesaid part formed the rack is called a rack-formed section, and the residual part is called a non-rack-formed section.

More precisely, as shown in FIG. 1, the range of the rack-formed section 3 contains from an end 6 of the rack bar, including the part on which the rack teeth 2 are formed, until a position entered a little into the succeeding circular cross-sectional part 7 (in this invention, circular does not mean a shape that a part of the circle is flattened, but means practically full circle or near full circle crosssection). Though the end 6 of the rack bar is circular in FIG. 1 (also in FIG. 2), the end may have a shape that the part of the rack is extended, namely a shape wherein a part of the circle is flattened to a segmented-circle crosssection, depending on design of automobiles. Therefore, there are cases that the shape of the rack-formed section is circular in the both ends, and circular in only one end. On the other hand, the non-rack-formed section 4 contains the residual length other than the rack-formed section 3, and ordinarily has a circular crosssection in its all length. However, in some cases, a groove for a ball screw is formed in a part except both ends of the non-rack-formed section, as explained later. As can be seen by the above explanation, the rack-formed section and the non-rack-formed section can be joined smoothly, because the joining can be executed by butting the tube ends of both circular crosssection.

The rack-formed section is made by plastic working from a steel tube in this invention, as can be seen by the premise in this invention that the rack-formed section and the non-rack-formed section are joined by butting the tube ends of circular crosssection. Contrary to cutting process, plastic working can secure the thickness of the rack part, even if a steel tube is used as raw material. It is favorable that the plastic working for forming a rack is performed before joining to the non-rack-formed section. The reason is that there are merits that shorter mandrels can be used in the process being mentioned later, and area of lubrication treatment for the plastic working such as phosphate treatment can be lessened. On the other hand, there is no merit in plastic working after the joining. Besides, heat treatment such as hardening can be executed in any of before and after joining. For instance, heat treatment can be executed locally to the rack-formed section even after joining.

Figure 3:
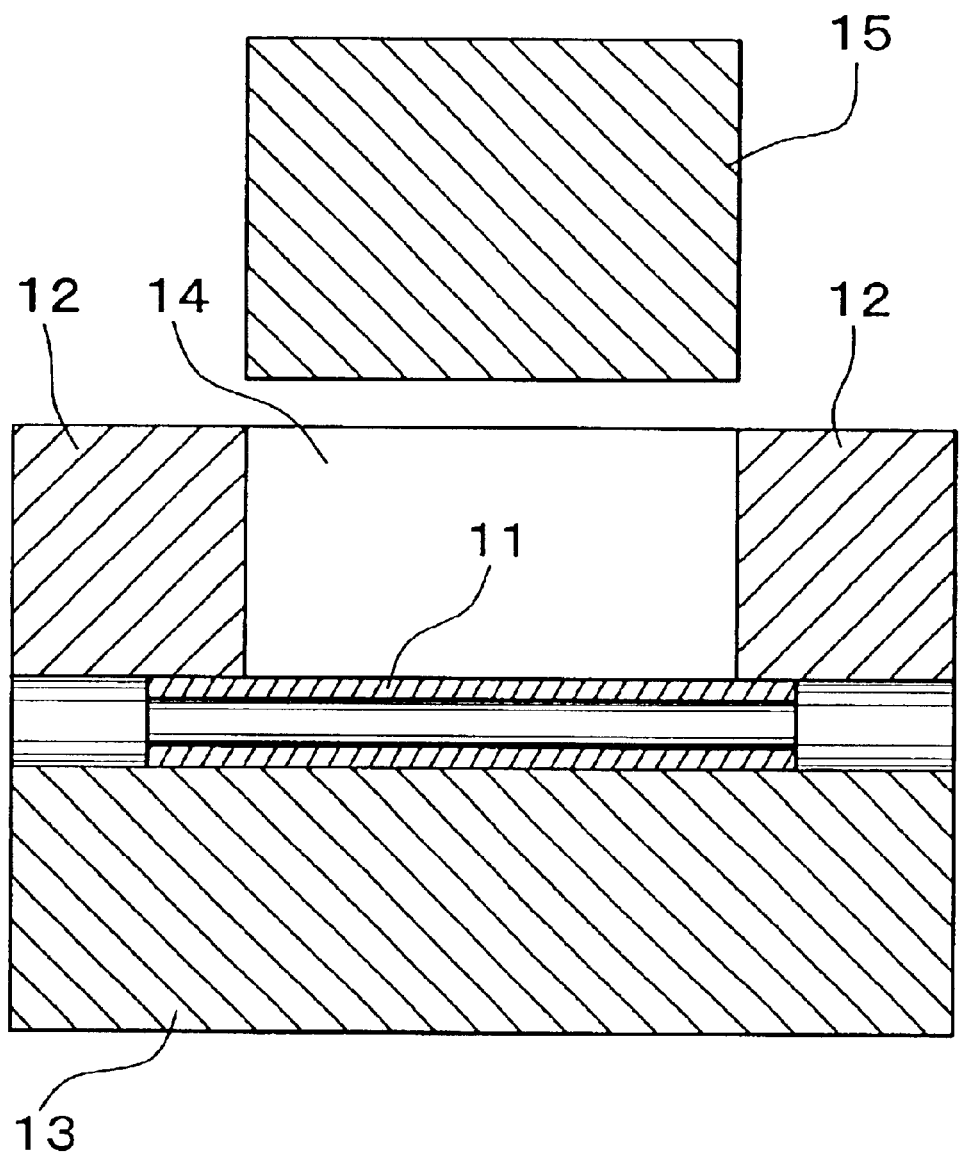
FIG. 3 and FIG. 4 are cross-sectional views from the side and the front respectively, which explain the method of forming a rack by plastic working in this invention.
Figure 4:
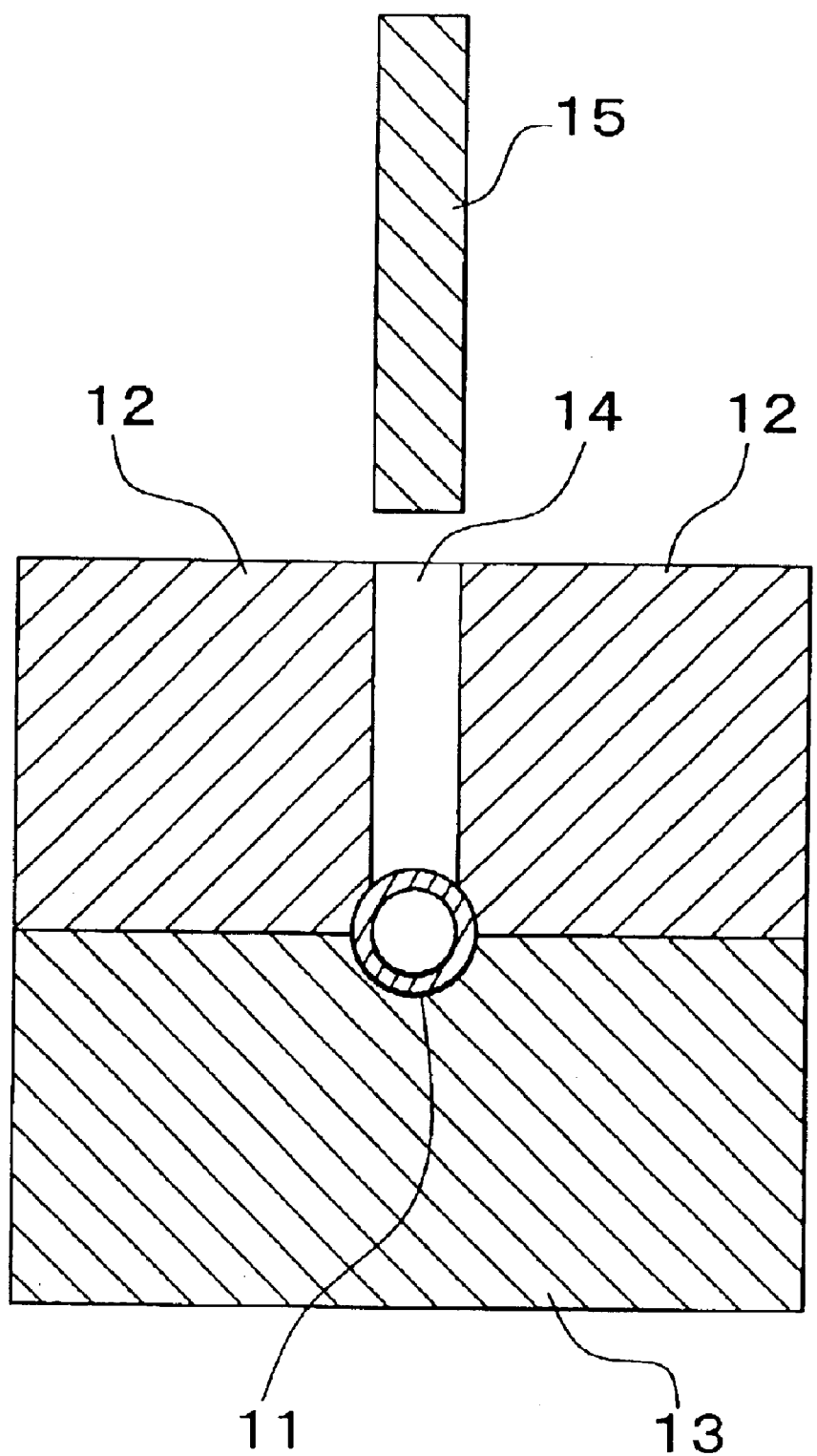

As for the method for forming a rack by plastic working, the following method is favorable. At first, as shown in FIG. 3 and FIG. 4 which are cross-sectional views from the side and the front respectively, a steel tube 11 is accommodated in a set of split dies 12, 13, which encircles the steel tube 11 wholly. The dies form a hole 14 which extends perpendicular to the axis of the steel tube, at an area coinciding with a part of the tube to be processed. After the steel tube is held in the split dies, a punch 15 is inserted into the hole 14 in order to press this part of the steel tube 11 and form a flat surface thereon. The flattening is executed on a part except at least one end part of the steel tube 11. Namely, as mentioned before, there are cases that the shape of the rack-formed section 3 is circular in the both ends as shown in FIG. 1, and circular in only one end. Depending on the cases, it is changed whether flattening is executed as remaining both end parts or one end part of the steel tube (FIG. 3 and FIG. 4 show the case flattened as remaining both end parts).

Besides, flattening can be executed in the state that the circumference of the steel tube is open, in order to merely flatten a part of the circumference of the tube. However, it is favorable that the punch is pushed at the state wherein the steel tube is accommodated in the split dies which encircle the tube at the whole circumference, as above explained. By this method, deformation of the steel tube contour other than the flattened part can be prevented. In some occasions, the above-mentioned flattening process does not make a completely flat plane, but makes, for instance, a convex plane wherein the center of the width is a little raised. The term flattening in this invention includes the above case.

Figure 5:
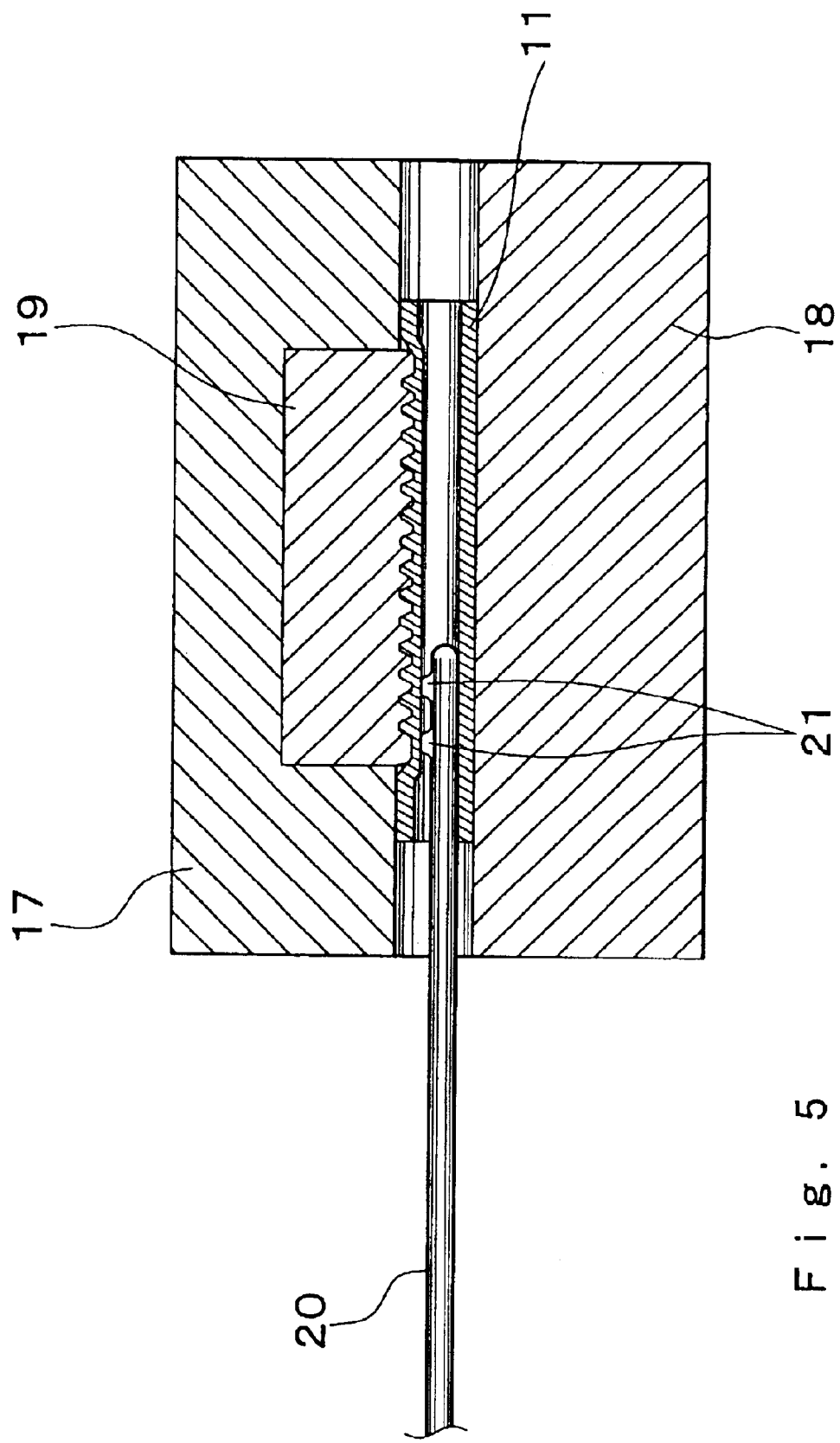
FIG. 5 and FIG. 6 are cross-sectional views from the side and the front respectively, which explain the next step of the process shown in FIG. 3 and FIG. 4.
Figure 6:
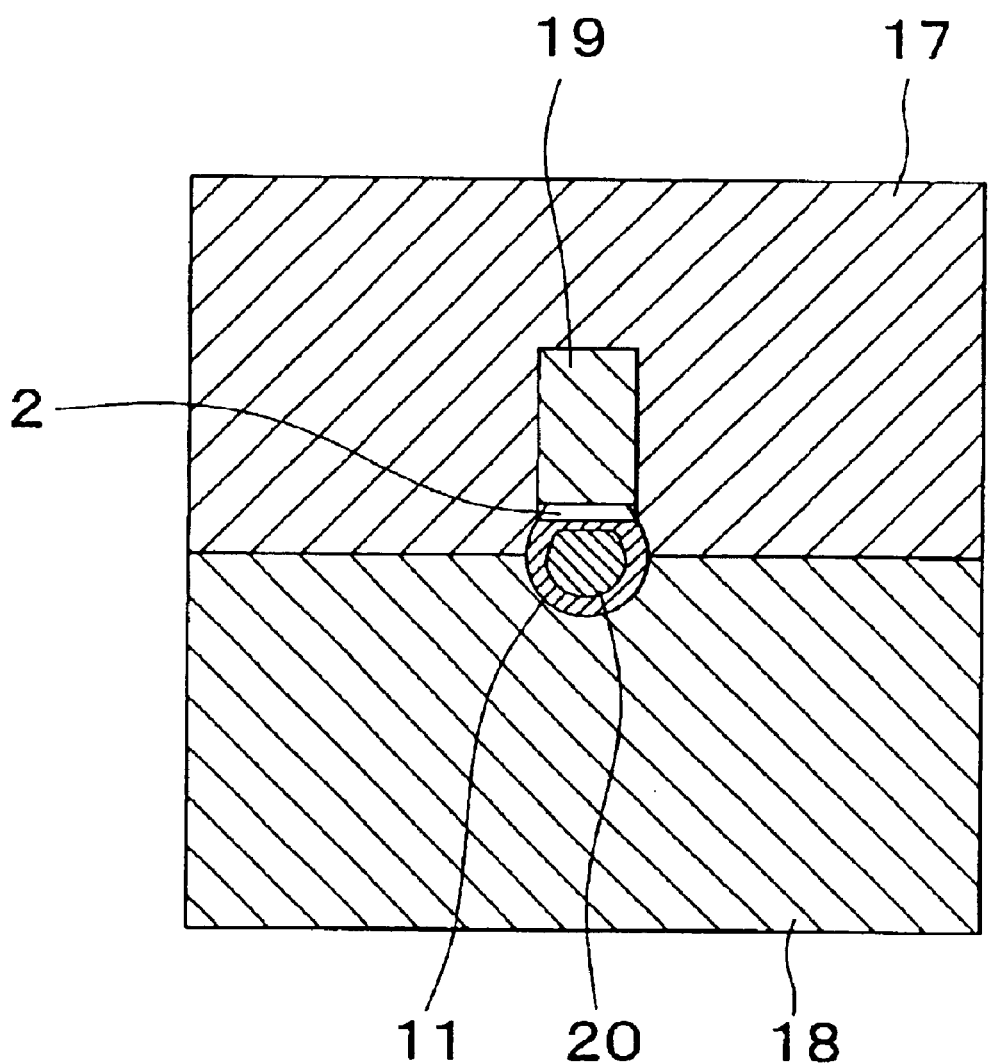

In the next place, as shown in FIG. 5 and FIG. 6 which are cross-sectional views from the side and the front respectively, the steel tube 11 is held in a set of another split dies 17, 18, which encircles the flattened tube wholly. In the interior of the split dies, a rack-forming die 19 which has a female pattern of the rack is set and in contact with the flattened part of the steel tube. In this alignment a mandrel 20 is pushed into the steel tube to form a rack on the tube conforming to the rack forming die 19, by successively ironing the flattened part from inside of the tube and rising metal from inside. The rack teeth are formed in multiple steps by inserting mandrels of incremental sizes, therefore, stokes of mandrels can be reduced by using the mandrels which have plural lumps 21 as the ironing points. Moreover, it is favorable to insert mandrels alternatively from both sides, so as to save working time. All of the above-mentioned plastic working can be carried out at room temperature. Besides, the rack-forming die 19 can be united in one body with the upper die 17 of the split dies in principle, however, it is favorable that the rack-forming die is independent and attachable to the upper die, because the rack forming die has a short life by suffering a large force.

Figure 7:
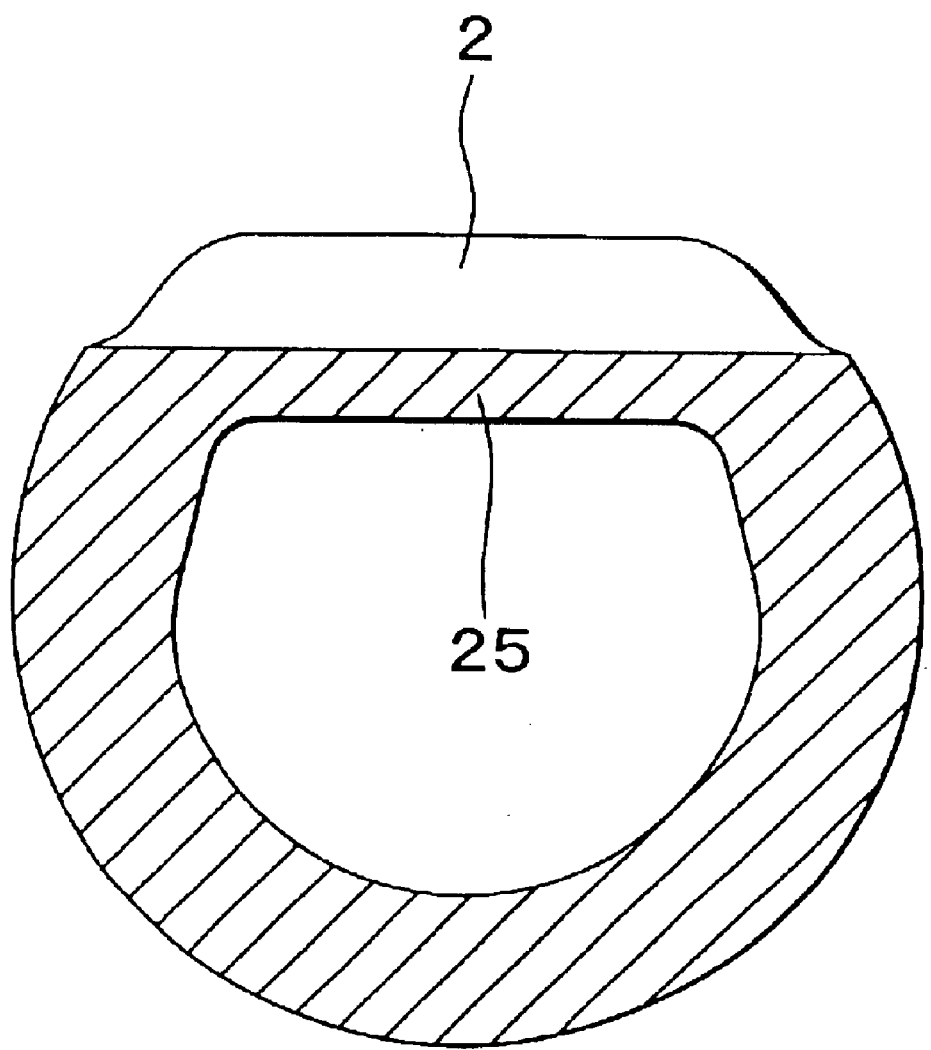
FIG. 7 is a cross-sectional view of the steering rack bar cut at a root of the rack tooth, wherein the rack bar is made by the method of this invention.

The above-mentioned process for forming a rack by plastic working demands raw material that has good plastic deformability, because the material is undergone severe deformation wherein the material is filled in the rack-forming die by ironing by the mandrels from the inside of the tube. On the other hand, material strength should be high in a product especially at a part of the rack. Namely, as shown in FIG. 7 which is a cross-sectional view of the rack bar cut at a root of the rack tooth, wherein the rack bar is made by the method of this invention, thickness at roots 25 of the rack teeth 2 is rather small in comparison with the thickness of the raw steel tube. This phenomenon is inevitable because of balance of the material amount in plastic deformation. Therefore, it is important to secure strength of the roots of the rack teeth. Accordingly, material cost of the rack-formed section becomes rather high, because the material requires good plastic deformability as raw material and high strength in a final product. On the other hand, the non-rack-formed section can use the material that contains higher carbon than the rack-formed section and does not contain alloying elements which are high cost. Because the non-rack-formed section does not require plastic deformability, it can use much carbon which gives strength in low cost. As explained above, this invention can provide products of ideal material property in a low cost, because it uses different materials as the raw steel tubes between the rack-formed section and the non-rack-formed section, and finally it makes a product of hollow steering rack bar by joining these two sections, wherein the rack-formed section requires severe material property for forming a rack by plastic working, and the non-rack-formed section requires moderate material property.

As for the steel of the rack-formed section, it contains carbon, for instance, 0.15 to 0.34%, in consideration of poise between limiting carbon content which impairs plastic deformability and securing strength of the product. Moreover, the steel should have composition that can be hardened as being not affected by mass effect and maintaining a hardened micro-structure even at the center of the material thickness, because the strength should be secured by hardening process after the plastic working. For this purpose, the steel contains, for instance, 1.2 to 1.8% of manganese, additional to 0.10 to 0.40% of silicon which is ordinarily contained together with above-mentioned carbon. In some cases, it is favorable to be contained alloying elements such as 0.30 to 0.80% of chromium.

On the other hand, the non-rack-formed section is not undergone plastic working as remaining a shape of raw steel tube. Otherwise, in some cases the non-rack-formed section is formed a groove for a ball screw as mentioning later, however, in any case the non-rack-formed section is not undergone severe plastic deformation. Consequently, the steel of the non-rack-formed section contains 0.35% or more of carbon, preferably 0.40% or more in order to secure enough strength. The carbon content is not more than 0.60% from a standpoint of toughness. Besides, the carbon content is favorable to be higher 0.1% or more than the carbon content of the rack-formed section, in order to exhibit the characteristic point of the both materials. As for another components, the steel of the non-rack-formed section contains 0.10 to 0.40% of silicon, 0.5 to 1.0% of manganese and iron as remainder except unavoidable impurities. Manganese content may be higher than the above range, for instance, up to 1.8% for the material property, however, the above range is appropriate from a standpoint of cost.

After forming the rack, hardening is performed in order to secure necessary strength. The hardening should be performed at least in the part of rack teeth, by heating a whole thickness of material to a hardening temperature. Namely, surface hardening is insufficient for the purpose to secure necessary strength, therefore, at least the roots of the rack teeth should have hardened micro-structure throughout the total thickness. Consequently, it is favorable that the steel of rack-formed section has such as the above-mentioned composition, in order to secure hardened structure even at the center of thickness where cooling rate is slow, as being not affected by mass effect. Besides, though the position where requirement for hardening is large is only the rack teeth, whole circumference of the tube at the rack-formed section may be hardened, as taking account of warping caused by heating asymmetrically to the axis of the rack bar. Hardening can be executed at one of steps of the process after forming the rack in any of before and after joining.

Additionally, as for heat treatment other than the above-mentioned hardening, intermediate annealing may be executed for softening by recrystallization, in the case that the plastic working is difficult to continue in an intermediate stage of the rack forming because of work hardening. In some cases, spherodizing annealing may be executed before the rack forming, in order to improve deformability by making carbide shape spherical. However, it is favorable to choose steel wherein the spherodizing annealing is unnecessary, as making the most of the merit of this invention that the ideal material can be chosen for each of the rack-formed section and non rack-formed section, because the spherodizing annealing is time consuming and high cost. On the other hand, heat treatment of the non-rack-formed section can be surface hardening, because there is no part where the thickness becomes so small as the roots of the rack teeth. Accordingly, the steel containing no alloying element can be used for the non-rack-formed section as mentioned before, because mass effect which has influence to the depth of hardening is not necessary to take into account. Naturally, hardening of non-rack-formed section can be executed in any of before and after joining.

Figure 8:
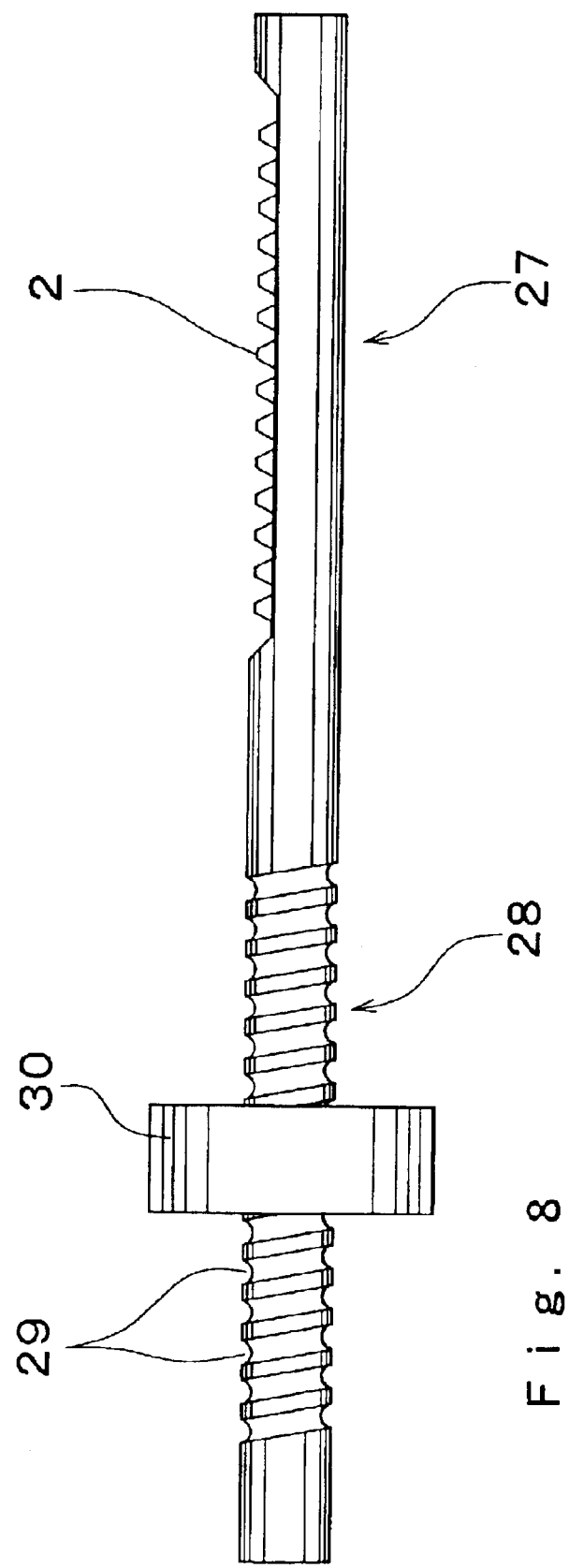
FIG. 8 shows the steering rack bar of this invention, which is used for electromotive power steering mechanism.

Generally, steering rack bars are applied for hydraulic power steering. In this case, the shape of the non-rack-formed section is a simple circular tube as shown in the aforementioned drawings. Recently, use of electro-motive force for the power source of the power steering is increasing to simplify mechanism. FIG. 8 is explaining concept of electro-motive power steering mechanism. A groove 29 for a ball screw is provided in a part of length of the non-rack-formed section 28, and a ball screw is composed including the groove, as shown in FIG. 8. Hereupon, the outer part of the ball screw, namely a nut-part 30 is fixed for the axial position and can be rotated by a motor not shown in drawings. Consequently, the rotating force of the motor is converted into a thrust force of the rack bar by the ball screw, and then the action of power steering is generated.

In the hollow steering rack bar of this invention, such case as shown in FIG. 8 is included, wherein the groove 29 for the ball screw is provided in a part of length of the non-rack-formed section 28. As for the manufacturing process of the steering rack bar in this case, a groove for a ball screw is formed on a raw steel tube, and then the steel tube is joined to the rack-formed section 27 which is formed a rack on another steel tube. In the above process, the rack forming and the screw forming can be performed without interference each other by the formerly formed parts, as making the most of this invention.

This invention does not restrict the method to join the rack-formed section and the non rack-formed section. As for the applicable joining method, there are friction welding, resistance-butt welding, flash-butt welding, and moreover, arc welding such as TIG welding. Within the above welding methods, friction welding is especially favorable, wherein the end faces to be joined is frictionally rotated each other, and the end faces are pushed together after stopped the rotation. The friction welding has high efficiency and high reliability, and scarcely makes bulge or burr at the joint. Besides, because the bulge or burr has no problem concerning joint characteristics, it is not necessary to be removed, if it is not an obstacle depending on the design of automobiles.

Figure 9:
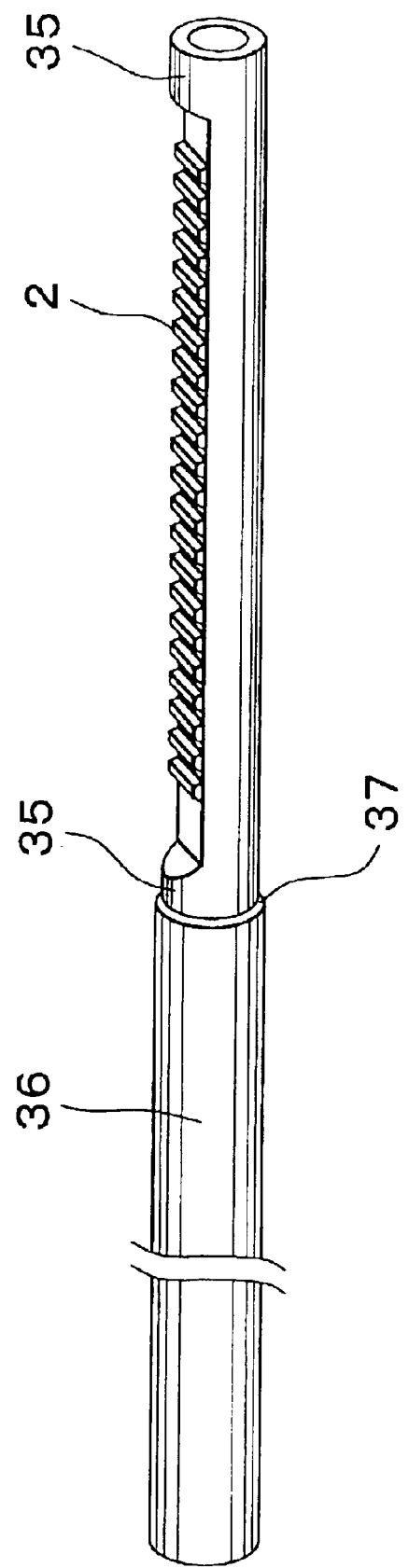
FIG. 9 is a perspective view of a steering rack bar of this invention, as an example other than FIG. 2.

FIG. 9 is a perspective view of the rack bar of this invention, showing an example other than FIG. 2. Namely, depending on the design of automobiles, there are cases that the outer diameter of the circular part is equal in overall length as shown in FIG. 2, and that the outer diameter is partly different as shown in FIG. 9, wherein the outer diameter of the circular part 35 near the rack 2 is, for instance, smaller than the outer diameter of the non-rack-formed section 36. In case that the outer diameter is partly different as explained above, a part of the steel tube has been drawn to decrease the diameter, or else, a part of the steel tube has been expanded to increase the diameter, for instance, by insertion of mandrels, in conventional rack-forming processes by plastic working. In this invention, such forming processes to change the outer diameter of the steel tube become unnecessary, by means of using steel tubes of different outer diameter as raw material between the rack-formed section and the non-rack-formed section, and joining them at the step point 37 to make the rack bar of partly different outer diameter. Besides, in case of avoiding abrupt change of outer diameter at the joined point, joining may be performed after making the outer diameters of the tubes equal at the joint, by means that the end of the steel tube of smaller diameter is flared, or else, the end of the steel tube of larger diameter is swaged.

Moreover in this invention, raw steel tubes of different thickness can be used between the rack-formed section and the non-rack-formed section. Accordingly, the thickness of the non-rack-formed section can be smaller than the thickness of the part of circular crosssection in the rack-formed section, whereby the outer diameter is equal in overall length and the inner diameter is larger only in the non-rack-formed section. Also the thickness of the non-rack-formed section can be smaller, in case of different outer diameter between the rack-formed section and the non-rack-formed section as above-mentioned. As above explained, weight of the steering rack bar can be decreased by economizing material, by making thinner the non-rack-formed section which has a margin of the strength. Besides, in case of avoiding abrupt change of thickness at the joined point, joining may be performed after pressing down the end of the thicker steel tube to match the thickness of the thinner steel tube. The above method using thinner raw steel tube for the non-rack-formed section than the rack-formed section may be performed together with the afore-mentioned method using steels of different constituents between the rack-formed section and the non-rack-formed section, and also the method can exhibit its effect by not performed together and singly performed.

The present invention should not be limited to the embodiment as explained above with reference to the drawings. The present invention can be modified or improved appropriately in practice without loss of the effectiveness within the technological concepts and features of the present invention.

What is claimed is:

1. A steering rack bar, which is hollowed in an overall length, and has a rack on a part of the length: wherein
   the rack bar is comprised of a rack-formed section and a non-rack-formed section, wherein the rack-formed section contains one end of the rack bar, the rack and a portion of a succeeding circular cross-sectional part, and the non-rack-formed section contains a residual length other than the rack-formed section; and
   the rack bar is constructed by joining the rack-formed section and the non-rack-formed section, wherein constituents of steels are different between the rack-formed section and the non-rack-formed section and carbon content of the non-rack-formed section is higher than that of the rack-formed section.

2. A steering rack bar, which is hollowed in an overall length, and has a rack on a part of the length: wherein
   the rack bar is comprised of a rack-formed section and a non-rack-formed section, wherein the rack-formed section contains one end of the rack bar, the rack and a portion of a succeeding circular cross-sectional part, and the non-rack-formed section contains a residual length other than the rack-formed section; and
   the rack bar is constructed by joining the rack-formed section and the non-rack-formed section, wherein the thickness of the non-rack-formed section is smaller than the thickness of the circular cross-sectional part of the rack-formed section.

3. The steering rack bar as claimed in claim 1, wherein the thickness of the non-rack-formed section is smaller than the thickness of the circular cross-sectional part of the rack-formed section.

4. The steering rack bar as claimed in claim 1, wherein the steel of the non-rack-formed section is composed of 0.35 to 0.60% of carbon, 0.10 to 0.40% of silicon, 0.5 to 1.0% of manganese, in weight percent, and iron as remainder except unavoidable impurities.

5. The steering rack bar as claimed in claim 1, wherein outer diameters are different between the circular cross-sectional part of the rack-formed section and the non-rack-formed section.

6. The steering rack bar as claimed in claim 1, wherein a groove for a ball screw is provided in a part of length of the non-rack-formed section.

7. The steering rack bar as claimed in claim 5, wherein a groove for a ball screw is provided in a part of length of the non-rack-formed section.

8. The steering rack bar as claimed in claim 1, wherein at least roots of rack teeth, of the rack-formed section, have a hardened structure throughout a whole thickness.

9. A method of manufacturing a hollow steering rack bar, the method comprising:
   forming a rack on a first steel tube by plastic working, wherein the rack is not formed at least in one end part of the first steel tube; and
   joining the first steel tube on which is formed said rack and a second steel tube by butting said one end part of the first steel tube and an end of the second steel tube, wherein constituents of steels are different between the first steel tube and the second steel tube, with carbon content of the second steel tube being higher than that of the first steel tube.

10. A method of manufacturing a hollow steering rack bar, the method comprising:
forming a rack on a first steel tube by plastic working, wherein the rack is not formed at least in one end part of the first steel tube; and
joining the first steel tube on which is formed said rack and a second steel tube by butting said one end part of the first steel tube and an end of the second steel tube, wherein the second steel tube is thinner than the first steel tube.

11. The method as claimed in claim 9, wherein the second steel tube is thinner than the first steel tube.

12. A method of manufacturing a hollow steering rack bar, the method comprising:
forming a rack on a first steel tube by plastic working, wherein the rack is not formed at least in one end part of the first steel tube; and
joining the first steel tube on which is formed said rack and a second steel tube by butting said one end part of the first steel tube and an end of the second steel tube, wherein outer diameters of the first steel tube and the second steel tube are different.

13. The method as claimed in claim 9, wherein outer diameters of the first steel tube and the second steel tube are different.

14. The method as claimed in claim 9, wherein a groove for a ball screw is formed in a part of length of the second steel tube before said joining.

15. The method as claimed in claim 13, wherein a groove for a ball screw is formed in a part of length of the second steel tube before said joining.

16. The method as claimed in claim 9, wherein forming the rack on the first steel tube by the plastic working comprises:
flattening by pressing a part of a circumference of the first steel tube, wherein at least one end part of the first steel tube is not flattened;
holding the flattened steel tube in a set of split dies, wherein the flattened part is in contact with a female pattern of the rack which is equipped inside of the split dies; and
successively inserting mandrels into the steel tube and forming the rack corresponding to the female pattern of the rack by ironing the flattened part of the steel tube from the inside of the steel tube.

17. The method as claimed in claim 9, wherein at least rack teeth of the rack are hardened at one of steps of the method after forming the rack, wherein the hardening is performed by heating a whole thickness of material to a hardening temperature.

18. The method as claimed in claim 9, wherein the joining is performed by friction welding.

19. The steering rack bar as claimed in claim 3, wherein the steel of the non-rack-formed section is composed of 0.35 to 0.60% of carbon, 0.10 to 0.40% of silicon, 0.5 to 1.0% of manganese, in weight percent, and iron as remainder except unavoidable impurities.

20. The steering rack bar as claimed in claim 2, wherein outer diameters are different between the circular cross-sectional part of the rack-formed section and the non-rack-formed section.

21. The steering rack bar as claimed in claim 20, wherein a groove for a ball screw is provided in a part of length of the non-rack-formed section.

22. The steering rack bar as claimed in claim 3, wherein outer diameters are different between the circular cross-sectional part of the rack-formed section and the non-rack-formed section.

23. The steering rack bar as claimed in claim 22, wherein a groove for a ball screw is provided in a part of length of the non-rack-formed section.

24. The steering rack bar as claimed in claim 2, wherein a groove for a ball screw is provided in a part of length of the non-rack-formed section.

25. The steering rack bar as claimed in claim 3, wherein a groove for a ball screw is provided in a part of length of the non-rack-formed section.

26. The steering rack bar as claimed in claim 2, wherein at least roots of rack teeth, of the rack-formed section, have a hardened structure throughout a whole thickness.

27. The steering rack bar as claimed in claim 3, wherein at least roots of rack teeth, of the rack-formed section, have a hardened structure throughout a whole thickness.

28. The method as claimed in claim 10, wherein outer diameters of the first steel tube and the second steel tube are different.

29. The method as claimed in claim 28, wherein a groove for a ball screw is formed in a part of length of the second steel tube before said joining.

30. The method as claimed in claim 11, wherein outer diameters of the first steel tube and the second steel tube are different.

31. The method as claimed in claim 30, wherein a groove for a ball screw is formed in a part of length of the second steel tube before said joining.

32. The method as claimed in claim 10, wherein a groove for a ball screw is formed in a part of length of the second steel tube before said joining.

33. The method as claimed in claim 11, wherein a groove for a ball screw is formed in a part of length of the second steel tube before said joining.

34. The method as claimed in claim 12, wherein a groove for a ball screw is formed in a part of length of the second steel tube before said joining.

35. The method as claimed in claim 10, wherein forming the rack on the first steel tube by the plastic working comprises:
flattening by pressing a part of a circumference of the first steel tube, wherein at least one end part of the first steel tube is not flattened;
holding the flattened steel tube in a set of split dies, wherein the flattened part is in contact with a female pattern of the rack which is equipped inside of the split dies; and
successively inserting mandrels into the steel tube and forming the rack corresponding to the female pattern of the rack by ironing the flattened part of the steel tube from the inside of the steel tube.

36. The method as claimed in claim 11, wherein forming the rack on the first steel tube by the plastic working comprises:
flattening by pressing a part of a circumference of the first steel tube, wherein at least one end part of the first steel tube is not flattened;
holding the flattened steel tube in a set of split dies, wherein the flattened part is in contact with a female pattern of the rack which is equipped inside of the split dies; and
successively inserting mandrels into the steel tube and forming the rack corresponding to the female pattern of the rack by ironing the flattened part of the steel tube from the inside of the steel tube.

37. The method as claimed in claim 12, wherein forming the rack on the first steel tube by the plastic working comprises:

flattening by pressing a part of a circumference of the first steel tube, wherein at least one end part of the first steel tube is not flattened;

holding the flattened steel tube in a set of split dies, wherein the flattened part is in contact with a female pattern of the rack which is equipped inside of the split dies; and successively inserting mandrels into the steel tube and forming the rack corresponding to the female pattern of the rack by ironing the flattened part of the steel tube from the inside of the steel tube.

38. The method as claimed in claim 10, wherein at least rack teeth of the rack are hardened at one of steps of the method after forming the rack, wherein the hardening is performed by heating a whole thickness of material to a hardening temperature.

39. The method as claimed in claim 11, wherein at least rack teeth of the rack are hardened at one of steps of the method after forming the rack, wherein the hardening is performed by heating a whole thickness of material to a hardening temperature.

40. The method as claimed in claim 12, wherein at least rack teeth of the rack are hardened at one of steps of the method after forming the rack, wherein the hardening is performed by heating a whole thickness of material to a hardening temperature.

41. The method as claimed in claim 10, wherein the joining is performed by friction welding.

42. The method as claimed in claim 11, wherein the joining is performed by friction welding.

43. The method as claimed in claim 12, wherein the joining is performed by friction welding.

* * * * *